United States Patent
Ishida et al.

(10) Patent No.: US 10,512,864 B2
(45) Date of Patent: Dec. 24, 2019

(54) OIL SEPARATOR

(71) Applicant: TOKYO ROKI CO., LTD., Yokohama-shi, Kanagawa (JP)

(72) Inventors: Kosaku Ishida, Yokohama (JP); Kazuaki Murai, Yokohama (JP); Yoshitaka Watanabe, Yokohama (JP)

(73) Assignee: TOKYO ROKI CO., LTD., Yokohama-shi (JP)

( * ) Notice: Subject to any disclaimer, the term of this patent is extended or adjusted under 35 U.S.C. 154(b) by 491 days.

(21) Appl. No.: 15/128,147

(22) PCT Filed: Mar. 27, 2014

(86) PCT No.: PCT/JP2014/058765
§ 371 (c)(1),
(2) Date: Nov. 1, 2016

(87) PCT Pub. No.: WO2015/145646
PCT Pub. Date: Oct. 1, 2015

(65) Prior Publication Data
US 2017/0120176 A1 May 4, 2017

(51) Int. Cl.
*B01D 46/18* (2006.01)
*B01D 45/14* (2006.01)
(Continued)

(52) U.S. Cl.
CPC ............. *B01D 45/14* (2013.01); *B01D 45/12* (2013.01); *F01M 13/04* (2013.01); *B04B 5/005* (2013.01);
(Continued)

(58) Field of Classification Search
CPC ........ B01D 45/14; B01D 45/12; B04B 5/005; B04B 5/12; B04B 11/02; B04B 2005/125;
(Continued)

(56) References Cited

U.S. PATENT DOCUMENTS 2,028,955 A 1/1936 Shenstone
3,234,716 A * 2/1966 Sevin .................... B01D 45/14
209/710
(Continued)

FOREIGN PATENT DOCUMENTS

EP 2050505 A2 4/2009
JP 2011-528280 A 11/2011
(Continued)

OTHER PUBLICATIONS

Japanese Office Action in counterpart patent application JP 2016-509736, JPO, dated Apr. 11, 2017, with English translation thereof.
(Continued)

*Primary Examiner* — Dung H Bui
(74) *Attorney, Agent, or Firm* — Harness, Dickey & Pierce, P.L.C.

(57) ABSTRACT

An oil separator configured to separate from gas mist oil contained in target gas of the present invention is aimed to enhance separation efficiency of oil mist contained in target gas while reducing the weight of the separation disks. The oil separator of the present invention includes a rotor. This rotor has a plurality of separation disks 34 (61, 62) layered along the axis line of the spindle. Each of the separation disks 34 are configured with truncated cone shape plate members and have formed concavo-convex ribs 64, 65 extending from the rotational center in the radiation direction on the outer peripheral side parts 61*b*, 62*b* corresponding to the inclined surfaces of the truncated cone. The concavo-convex ribs 64, 65 include first convex portions 66 and second convex portions 67 where the first convex portions 66 include on the outer peripheral side parts 61*b*, 62*b* a convex on the front surface side and a concave on the back surface side, and the second convex portions 67 include
(Continued)

on the outer peripheral side parts 61b, 62b a convex on the back surface side and a concave on the front surface side.

5 Claims, 14 Drawing Sheets

(51) Int. Cl.
    *B01D 45/12* (2006.01)
    *F01M 13/04* (2006.01)
    *B04B 5/00* (2006.01)
    *B04B 5/12* (2006.01)

(52) U.S. Cl.
    CPC ................. *B04B 2005/125* (2013.01); *F01M 2013/0422* (2013.01)

(58) Field of Classification Search
    CPC . B04B 7/14; B04B 1/08; F01M 13/04; F01M 2013/0422
    See application file for complete search history.

(56) References Cited

U.S. PATENT DOCUMENTS

| | | | | |
|---|---|---|---|---|
| 6,017,300 A * | 1/2000 | Herman | ................. | B04B 1/08 210/167.02 |
| 6,110,246 A * | 8/2000 | Eubank | ................. | B01D 45/14 55/394 |
| 6,183,407 B1 * | 2/2001 | Hallgren | ................. | B04B 1/04 494/49 |
| 6,821,319 B1 * | 11/2004 | Moberg | ................. | B01D 45/14 55/385.3 |
| 7,077,881 B2 * | 7/2006 | Franzen | ................. | B01D 45/14 210/512.1 |
| 7,258,713 B2 * | 8/2007 | Eubank | ................. | F02M 35/022 55/401 |
| 7,811,347 B2 * | 10/2010 | Carlsson | ................. | B01D 45/14 55/385.3 |
| 2003/0233939 A1 * | 12/2003 | Szepessy | ................. | B01D 45/14 95/270 |
| 2004/0107681 A1 * | 6/2004 | Carlsson | ................. | B01D 45/14 55/406 |
| 2004/0214710 A1 * | 10/2004 | Herman | ................. | B04B 5/005 494/36 |
| 2005/0039604 A1 * | 2/2005 | Hallgren | ................. | B01D 45/12 96/281 |
| 2006/0142135 A1 * | 6/2006 | Hallgren | ................. | B01D 45/14 494/24 |
| 2007/0249479 A1 * | 10/2007 | Eliasson | ................. | B01D 45/14 494/43 |
| 2009/0013658 A1 * | 1/2009 | Borgstrom | ................. | B01D 45/14 55/447 |
| 2009/0186752 A1 * | 7/2009 | Isaksson | ................. | B01D 45/14 494/40 |
| 2010/0011723 A1 | 1/2010 | Szepessy et al. | | |
| 2010/0180854 A1 | 7/2010 | Baumann et al. | | |
| 2011/0011795 A1 * | 1/2011 | Hoff | ................. | B04B 5/005 210/512.1 |
| 2011/0195832 A1 | 8/2011 | Rudman et al. | | |
| 2011/0237417 A1 * | 9/2011 | Rudman | ................. | B04B 1/08 494/70 |
| 2011/0281712 A1 * | 11/2011 | Schlamann | ................. | B01D 45/14 494/7 |
| 2016/0082378 A1 * | 3/2016 | Ishida | ................. | B01D 45/12 55/403 |
| 2017/0072409 A1 * | 3/2017 | Pogen | ................. | B04B 5/12 |
| 2018/0179929 A1 * | 6/2018 | Ishida | ................. | B04B 1/04 |

FOREIGN PATENT DOCUMENTS

| | | |
|---|---|---|
| JP | 2012-504051 A | 2/2012 |
| WO | WO-2010008342 A1 | 1/2010 |
| WO | WO-2010039095 A1 | 4/2010 |

OTHER PUBLICATIONS

International Preliminary Report on Patentability, IB/Geneva, dated Oct. 6, 2016, incorporating the Written Opinion of the ISA Ch. I, ISA/JP, dated Sep. 16, 2014.

Extended European Search Report for parallel application EP 14887466.2, EPO/Munich, dated Jul. 20, 2017.

JP Office Action for counterpart Japanese patent application JP 2016-509736 drafted Jun. 16, 2017 and dated Jun. 20, 2017, with English translation thereof.

* cited by examiner

OIL SEPARATOR

CROSS-REFERENCE TO RELATED APPLICATION

This application is a 371 U.S. National Stage of International Application No. PCT/JP2014/058765, filed Mar. 27, 2014. The disclosures of the above application are incorporated herein by reference.

TECHNICAL FIELD

The present invention relates to an oil separator that separates mist oil contained in target gas from the gas.

BACKGROUND ART

There has been known an oil separator that separates mist oil contained in target gas from the gas. For example, an oil separator described in Patent Literature 1 includes a cylindrical stationary housing, a cylindrical stationary casing with a ceiling, and a conical partition with an opening on the top surface. These components define a chamber into a lower chamber (a lower side chamber) and an upper chamber (an upper side chamber). The lower chamber includes a centrifugal rotor to clean oil. The upper chamber includes a gas cleaning device to clean gas. A lower end of the stationary housing is coupled to a tubular base. The lower chamber is communicated with an internal space of the tubular base.

The gas cleaning device is provided with separation disks disposed in a layered state. This separation disk has a truncated cone shape in appearance from the side, causing the target gas to pass through between the separation disks while these separation disks are circumferentially rotated at high speed to separate oil mist from the target gas. On inclined surfaces of the separation disks, for example, a plurality of protrusions whose cross-sectional shapes are a wave shape (a sine curve) as described in Patent Literature 2 are circumferentially formed. These protrusions form clearances through which the target gas passes between the separation disks overlapped with one another.

CITATION LIST

Patent Literature

Patent Literature 1 Japanese Unexamined Patent Application Publication No. 2005-515065
Patent Literature 2 Japanese Unexamined Patent Application Publication No. 2012-504051

DISCLOSURE OF THE INVENTION

Problems to be Solved by the Invention

The separation disks with the above-described wave-shaped protrusions form tunnel-shaped spaces with the wave-shaped protrusions. Since the gas smoothly flows through the tunnel-shaped spaces, this causes a problem of losing separation efficiency of mist oil.

The present invention has been made under these circumstances, and an object of the present invention is to enhance separation efficiency of oil mist contained in target gas.

SUMMARY OF INVENTION

To achieve the above-described object, the present invention is an oil separator including a rotor rotatable together with a spindle, the rotor being configured to separate mist oil from target gas through a rotation, wherein the rotor includes an upper holder, a lower holder, and a separation disk, the separation disk is configured of a truncated-cone shaped plate member, the separation disk having formed a rib on an outer peripheral side part corresponding to an inclined surface of the truncated cone, the rib extending from a rotational center in a radiation direction, and the separation disk being layered in an axis line direction of the spindle, and the rib includes a first convex portion having on the outer peripheral side part a convex on a front surface side and a concave on a back surface side and a second convex portion having on the outer peripheral side part a convex on a back surface side and a concave on a front surface side.

According to the present invention, the rib formed on the separation disk includes a first convex portion and a second convex portion. The first convex portion has on its outer peripheral side part a convex on a front surface side and a concave on a back surface side. The second convex portion has on a front surface side a convex on a back surface side and a concave. The combination of these first convex portions and second convex portions forms parts through which the gas is difficult to flow in the middle of the tunnel-shaped spaces. This ensures enhancing separation efficiency of oil mist contained in the target gas.

In the above-described oil separator, it is preferable to further include a disk holding portion connected to the spindle, the disk holding portion being disposed in the axis line direction of the spindle, wherein the separation disk includes a first separation disk that includes a mounting opening at a center-side part, the mounting opening forming an opening edge that can be engaged to the disk holding portion, the first separation disk having circumferentially formed a plurality of first concavo-convex ribs at regular intervals on a surface of the outer peripheral side part, the first concavo-convex ribs extending from a rotational center in a radiation direction and a second separation disk that includes the mounting opening at a center-side part, the second separation disk having circumferentially formed a plurality of second concavo-convex ribs, the second concavo-convex ribs extending on a surface of the outer peripheral side part from a rotational center in a radiation direction, the second concavo-convex ribs being disposed between the first concavo-convex ribs circumferentially adjacent to one another with the disk holding portion inserted into the mounting opening. This configuration has the second concavo-convex rib abutting the thin between the first concavo-convex ribs and the first concavo-convex rib abutting the thin part between the second concavo-convex ribs. Each of the concavo-convex ribs abutting the thin part makes the thin part slightly curve so that a large number of separation disks can be layered. Consequently, the separation efficiency of oil mist contained in the target gas can be enhanced.

In the above-described oil separator, it is preferable that the mounting openings are disposed at the first separation disk and the second separation disk are formed into a regular polygonal shape in plan view, the first concavo-convex ribs are circumferentially disposed at intervals of 1/n times of an interior angle in the regular polygon, and the second concavo-convex ribs are circumferentially disposed at intervals of 1/n times of the interior angle at positions circumferentially displaced from the first concavo-convex ribs by ½n times of the interior angle. This configuration has the disk holding portion inserted into the mounting openings of the first separation disk and the second separation disk and the positions of the concavo-convex ribs are determined by engaging the opening edges to the disk holding portion.

Hereby, the work for layering the separation disks to the disk holding portion can be enhanced.

In the above-described oil separator, it is preferable to further include a disk holding portion connected to the spindle, the disk holding portion being disposed in the axis line direction of the spindle, wherein the separation disk includes a first separation disk that includes a mounting opening at a center-side part, the mounting opening forming an opening edge that can be engaged to the disk holding portion, the first separation disk having circumferentially formed a plurality of first concavo-convex ribs at regular intervals, the first convex portions and the second convex portions being formed in alternation on the first concavo-convex ribs and a second separation disk that includes the mounting opening at a center-side part, the second separation disk having circumferentially formed a plurality of second concavo-convex ribs, the second convex portions and the first convex portions being formed in alternation on the second concavo-convex ribs, the second concavo-convex ribs being formed at intervals identical to intervals of the first concavo-convex ribs, and the first separation disks and the second separation disks are layered in alternation with respect to the disk holding portion such that the first convex portions of the first concavo-convex ribs are brought into abutment with the second convex portions of the second concavo-convex ribs and the second convex portions of the first concavo-convex ribs are brought into abutment with the first convex portions of the second concavo-convex ribs. This configuration has the convex portions of the first concavo-convex ribs and the second concavo-convex ribs brought into abutment so to forms parts through which the gas is difficult to flow in the middle of the tunnel-shaped spaces. Hereby, the separation efficiency of oil mist contained in the target gas can be enhanced.

In the above-described oil separator, it is preferable to further include a nozzle that projects from a peripheral surface of the spindle on a lower side with respect to the separation disk, the nozzle being configured to inject oil from an injection hole to rotate the spindle about an axis line, a housing that partitions a chamber housing the spindle, the rotor, and the nozzle, and a gas introducing portion configured to introduce the target gas that is supplied from outside the housing to the mounting opening at a position on the spindle side with respect to a trace of the nozzle. This configuration has the target gas actively introduced into the mounting opening so that the separation efficiency of oil mist contained in the target gas can be enhanced Advantageous Effects of Invention According to the present invention, in an oil separator that separates mist oil contained in target gas from the gas, it is possible to enhance separation efficiency of oil mist contained in target gas while reducing the weight of the separation disks.

DETAILED DESCRIPTION

The following describes embodiments of the present invention with reference to the drawings. The following describes with an example of a closed crankcase ventilation system 1 (hereinafter referred to as a ventilation system 1) illustrated in FIG. 1.

Figure 1:
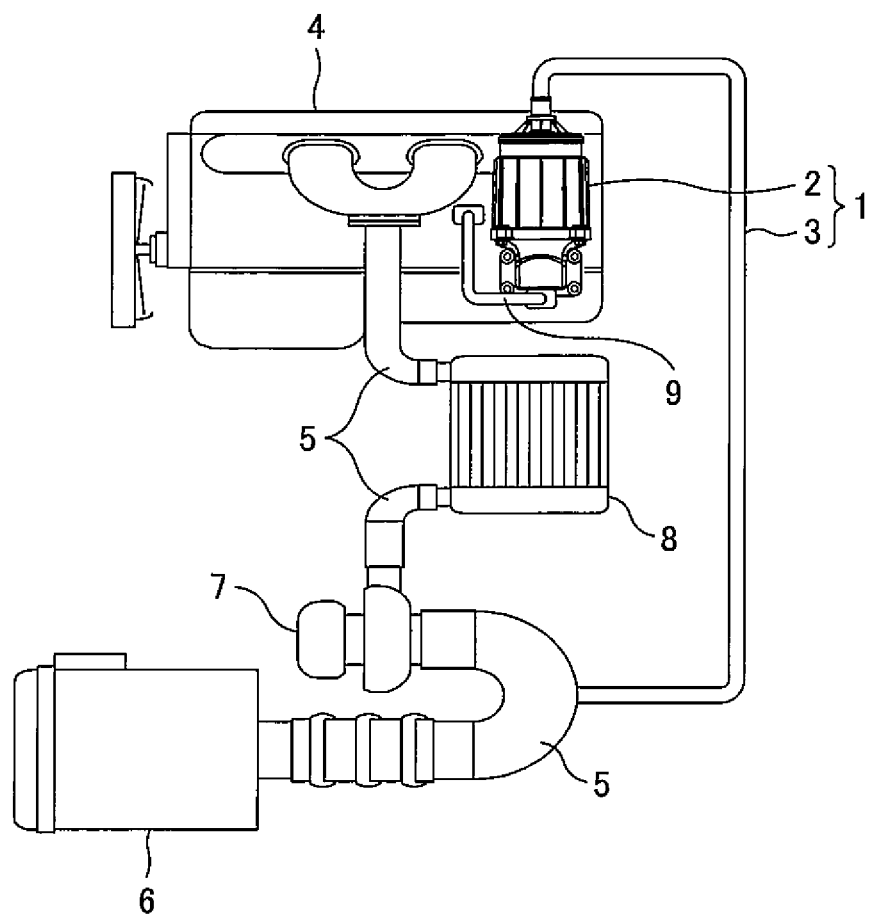
FIG. 1 is a schematic diagram illustrating a closed crankcase ventilation system.

As illustrated in FIG. 1, the ventilation system 1 includes an oil separator 2 and a breather pipe 3. The oil separator 2 processes blow-by gas (equivalent to target gas containing mist oil) discharged from an engine to separate the mist oil. This embodiment includes the oil separator 2 at a side surface of an engine 4. The breather pipe 3 constitutes a return flow passage, through which the processed blow-by gas discharged from the oil separator 2 returns to an intake-side flow passage 5 of the engine 4.

In this ventilation system 1, the blow-by gas discharged from the engine 4 is introduced to the oil separator 2 disposed at the side surface of the engine 4. The oil separated by the oil separator 2 is returned to the engine 4. On the other hand, the processed blow-by gas is discharged from an upper end portion of the oil separator 2 and then is returned to the intake-side flow passage 5 through the breather pipe 3. Specifically, the processed blow-by gas is returned to a part at which an air filter 6 is coupled to a turbocharger 7 in the intake-side flow passage 5. The returned blow-by gas is mixed with fresh air from the air filter 6 and is compressed by the turbocharger 7. Afterwards, the blow-by gas is cooled by a charge cooler 8 and is supplied to the engine 4.

Figure 2:
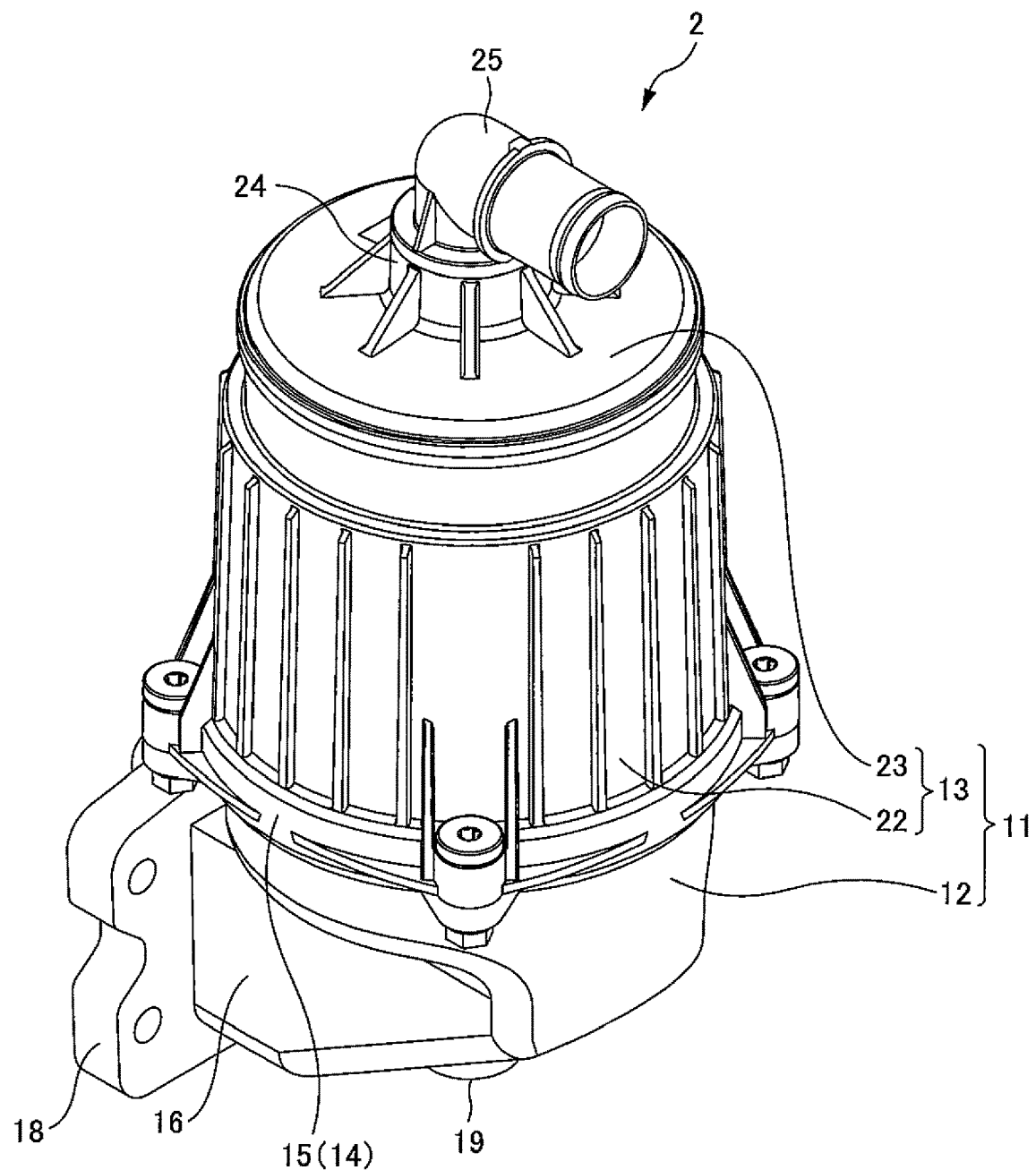
FIG. 2 is a view of an oil separator as viewed from obliquely above.

The following describes the oil separator 2. As illustrated in FIG. 2, this oil separator 2 includes a housing 11, which includes a lower case 12 and an upper case 13. The housing 11 houses various components such as a rotor unit and a PCV valve in an internal space (a chamber) (described later).

The lower case 12 is a part that constitutes and separates a lower side part of the housing 11. The lower case 12 is constituted of a box-shaped member having a bottom and an opened top surface. The upper half of the lower case 12 is configured in a cylindrical form. A circular fitted portion 14 is disposed on an upper end portion of the lower case 12, and is fitted to a lower end portion 15 of the upper case 13. The lower case 12 includes a communication tube portion 16 facing backward on the back surface, and the communication tube portion 16 communicates backward with the engine 4. At the proximity of this communication tube portion 16, a tubular member 17 (see FIG. 5, to be described later) is disposed. The communication tube portion 16 includes a flange 18 at its distal end portion, and the flange 18 is joined to the side surface of the engine 4. The lower case 12 in the present embodiment is made of cast metal, however, the lower case 12 may be made by molding resin.

The upper case 13 is a member mounted to the lower case 12 from above. The upper case 13 and the lower case 12 separate a chamber that houses components such as the rotor unit 21 (see FIG. 3.) This upper case 13 includes a cylindrical body cover 22 and a disk-shaped top surface cover 23. The top surface cover 23 is mounted in an airtight manner to the upper end portion of the body cover 22. A tubular gas discharge portion 24 is oriented upward at a center of the top surface cover 23. This gas discharge portion 24 is a part from which the processed blow-by gas is discharged. The breather pipe 3 is coupled to the gas discharge portion 25 via an outlet pipe 24.

Figure 3:
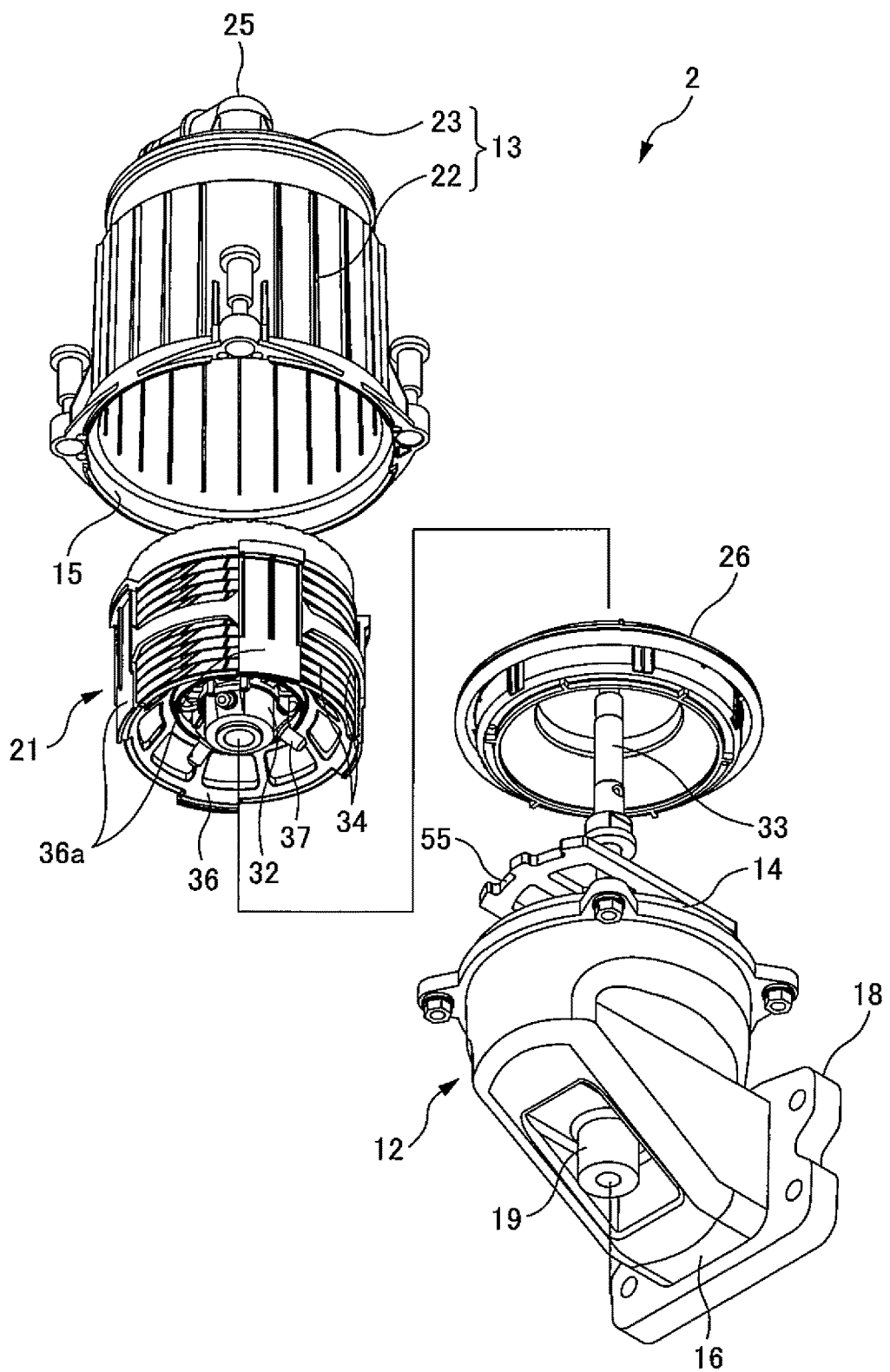
FIG. 3 is an exploded perspective view of the oil separator.

The following describes an internal structure of the oil separator 2. As illustrated in FIG. 3, the oil separator 2 internally includes the rotor unit 21 and a partition member 26. As illustrated in the cross-sectional view in FIG. 4, a PCV valve 27 is mounted to the inside of the top surface cover 23.

Figure 4:
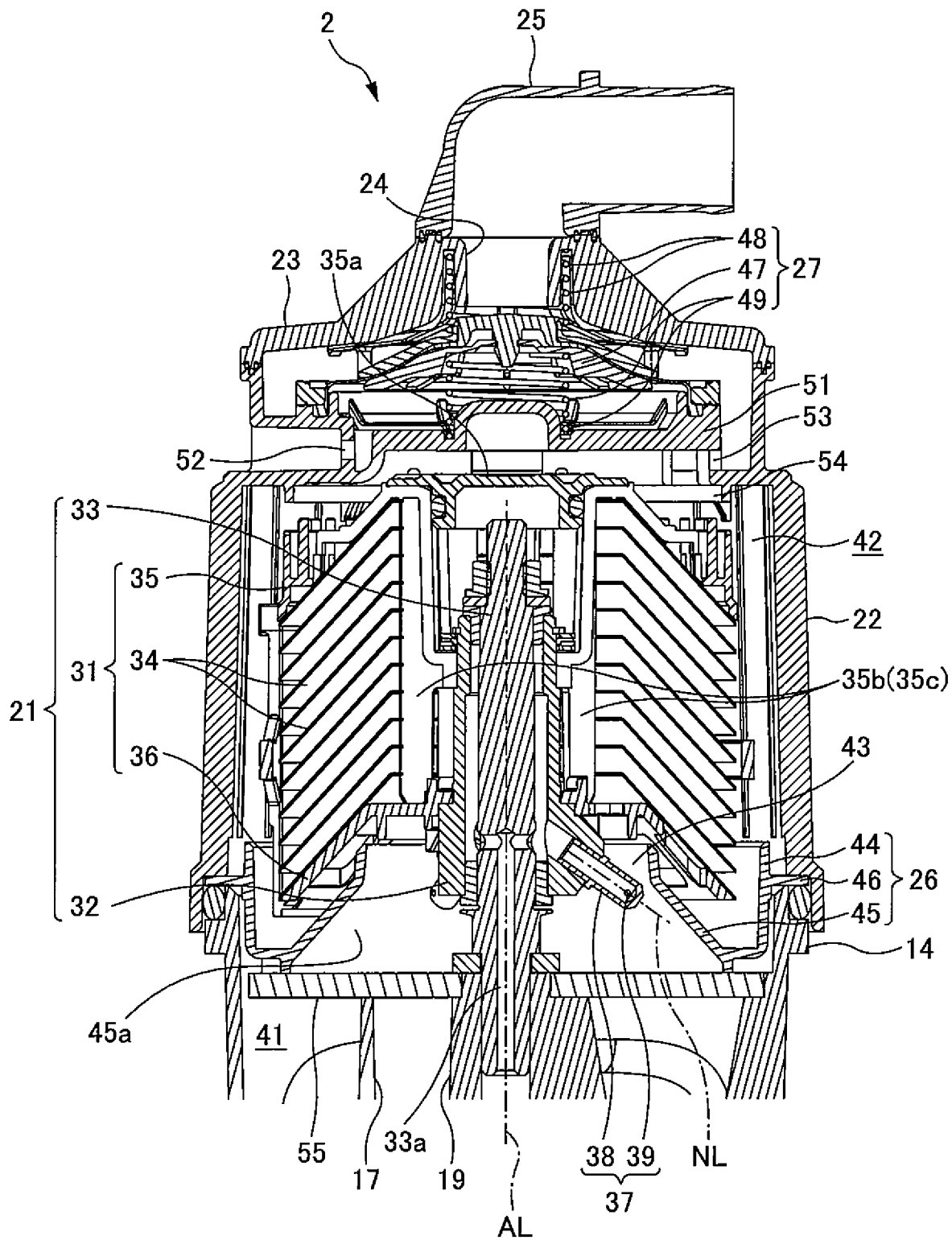
FIG. 4 is a cross-sectional view of an upper half portion of the oil separator.

First, the following describes the rotor unit 21. This rotor unit 21 is a mechanism to separate the mist oil contained in the blow-by gas. As illustrated in FIG. 4, the rotor unit 21 includes a rotor 31, a spindle 32, and a spindle shaft 33.

The rotor 31 is a part that condenses the mist oil through rotation and separates the mist oil from the blow-by gas. The rotor 31 includes a plurality of separation disks 34, an upper holder 35, and a lower holder 36. The separation disks 34 are formed with truncated cone shaped plate members. Description of these separation disks 34 will be given later. For convenience of explanation, the separation disks 34 in FIG. 4 are illustrated providing intervals from one another; however, the actual intervals are defined to be extremely narrow.

The upper holder 35 is a member that holds the plurality of layered separation disks 34 from above. Similarly, the lower holder 36 is a member that holds the separation disks 34 from below. As illustrated in FIG. 3, in the outer peripheral edge of the lower holder 36, a plurality of coupling arms 36a for coupling to the upper holder 35 are disposed. In this embodiment, the four coupling arms 36a are provided circumferentially at intervals of 90 degrees. The upper ends of the coupling arms 36a are joined to the upper holder 35 so that the plurality of separation disks 34, the upper holder 35, and the lower holder 36 are integrated to constitute the rotor 31.

This rotor 31 has a cylindrical appearance. On the inner peripheral side of the rotor 31, there is a hollow part and the hollow part vertically extends through. As illustrated in FIG. 4, the upper end of the hollow part, that is, the top central part of the upper holder 35 is hermetically closed with a cap member 35a. The spindle 32 is inserted into the hollow part of the rotor 31 and the spindle 32 and the rotor 31 are connected to one another. Accordingly, the rotor 31 rotates, together with the spindle 32, around the axis of the spindle 32.

Nozzles 37 project from a part of a peripheral surface of the spindle 32 located below the rotor 31. Each of the nozzles 37 is a part from which the oil supplied through the spindle shaft 33 is injected to generate a driving power to rotate the spindle 32 and the rotor 31.

The nozzles 37 of this embodiment include cylindrical nozzle bodies 38 and injection holes 39 disposed at distal end portions of the nozzle bodies 38. Base ends of the nozzle bodies 38 are coupled to the spindle 32, and the distal ends of the nozzle bodies 38 are closed. The nozzle bodies 38 are mounted at an obliquely downward angle with respect to the axial direction AL of the spindle 32 as indicated by reference symbol NL. The three nozzle bodies 38 are circumferentially disposed at intervals of 120 degrees. The injection hole 39 is disposed on a side surface at the distal end portion of the nozzle body 38. More specifically, the injection hole 39 is disposed in a direction perpendicular to the axial direction NL of the nozzle body 38 so that oil is injected horizontally.

The spindle shaft 33 is a pillar member serving as a bearing of the spindle 32, and supports the spindle 32 in a rotatable manner. The spindle shaft 33 internally includes an oil supply passage 33a to supply the oil. A lower end portion of the spindle shaft 33 is coupled to an upper end portion of the joint 19, which is disposed in the lower case 12. The oil supply pipe 9 (see FIG. 1) is coupled to this joint 19. Accordingly, the oil supplied through the oil supply pipe 9 passes through the joint 19, and then flows into the spindle shaft 33. Thereafter, the oil flows into the nozzle bodies 38, and then is injected from the injection holes 39.

As described above, the injection hole 39 is disposed at the distal end portion of the nozzle body 38 in a direction in which oil is injected horizontally. At the three nozzles 37 disposed at intervals of 120 degrees, formation positions for the injection holes 39 are matched. Accordingly, when the oil is injected from the respective injection holes 39, the rotor 31 and the spindle 32 rotate about the spindle shaft 33 as the axis.

The following describes the partition member 26. As illustrated in FIG. 4, the partition member 26 is a member that partitions the internal space (the chamber) of the housing 11 into a lower chamber 41 (a primary separation chamber) and an upper chamber 42 (a secondary separation chamber). And the partition member 27 forms a communication port 43, and the blow-by gas in the lower chamber 41 is guided by the communication port 43 to the upper chamber 42. The partition member 26 has an outer peripheral portion 44 and a tapered portion 45. The outer peripheral portion 44 is a short cylindrical part and has a collar portion 46 projecting outwardly at the middle in the height direction. The tapered portion 45 is disposed on the inner peripheral side with respect to the outer peripheral portion 44, and has a tapered shape in which the diameter is gradually reduced from the lower end of the outer peripheral portion 44 toward the top. The tapered portion 45 of this embodiment has an inclined surface 45a that inclines at an angle of approximately 45 degrees with respect to the axis of the spindle 32. An upper end opening of the tapered portion 45 forms the communication port 43.

The partition member 26 is fitted to the inner peripheral side of the fitted portion 14 in the lower case 12. The collar portion 46 abuts on an upper end of the fitted portion 14 from above to be positioned. Consequently, the tapered portion 45 is disposed immediately below the lower holder 36 included in the rotor 31. The chamber is partitioned into the lower chamber 41 and the upper chamber 42, which are bordered by the partition member 26. These lower chamber 41 and upper chamber 42 are communicated through the communication port 43.

When the rotor 31 rotates at a high speed, oil film, which is turning at high speed, is formed on the outer peripheral side with respect to the turning paths of the injection holes 39. When the blow-by gas contacts this oil film, the mist oil contained in the blow-by gas is taken in the oil film and is centrifuged. This makes it possible to reduce the mist oil content in the blow-by gas. Thus, in the lower chamber 41, the mist oil content in the blow-by gas can be reduced by the injection of the oil, which functions as the driving source for the spindle 32 and the rotor 31. Therefore, the lower chamber 41 functions as the primary separation chamber for the mist oil.

The following describes the PCV valve 27. As illustrated in FIG. 4, the PCV valve 27 includes a diaphragm 47, upper springs 48, and lower springs 49.

The diaphragm 47 is a valve element and is manufactured by molding rubber and resin. The diaphragm 47 is composed of a disk-shaped member. The upper springs 48 and the lower springs 49 are members to support the diaphragm 47 in such a manner that the diaphragm 47 can move vertically. This PCV valve 27 is disposed on a pedestal portion 51 at a position immediately below the top surface cover 23. The diaphragm 47 covers this pedestal portion 51 in an airtight manner. A space defined by the pedestal portion and the diaphragm 47 is open to open air through an air communicating portion 52.

The diaphragm 47 vertically moves according to intake-side pressure of the engine 4 and internal pressure of the crankcase, to adjust the flow of the blow-by gas. That is, under an excessively large intake pressure (negative pressure) of the engine 4, the diaphragm 47 moves toward the gas discharge portion 24 (upward), and under a high pressure of the side close to the crankcase, the diaphragm 47 moves toward the opposite side (downward).

Accordingly, when the pressure in the upper chamber 42 becomes higher than a PCV-set pressure, the diaphragm 47 moves downward to increase a flow rate of the blow-by gas. On the contrary, when the pressure in the upper chamber 42 is lower than the PCV-set pressure, the diaphragm 47 moves upward to reduce the flow rate of the blow-by gas. Thus, the flow rate of the blow-by gas is appropriately adjusted, and thereby the crankcase-side pressure of the engine 4 maintains within a constant range.

An outer periphery of the pedestal portion 51 on which the PCV valve 27 is placed is defined by a sidewall portion, the sidewall portion having a circular shape as viewed from above. A communicating window 53 is disposed at this sidewall portion. Through this communicating window 53, an upper part of the upper chamber 42 with respect to the diaphragm 47 and a part of the upper chamber 42 on the rotor 31 side communicate.

A cylindrical rib 54 is disposed at the lower side of the sidewall portion. This cylindrical rib 54 is a ring-shaped projection disposed at a position higher than the rotor 31 unit and lower than the diaphragm 47, and the cylindrical rib 54 is integrated with the body cover 22. In the upper end part of the body cover 22, the cylindrical rib 54 guides downwards fluid (oil and blow-by gas) which is flowing along the inner surface of the body cover 22 from the outer peripheral side to the inner peripheral side. Since this cylindrical rib 54 can also reduce the amount of oil that passes through the communicating window 53, it is possible to surely restrain an attachment of the oil to the PCV valve 27.

Figure 5:
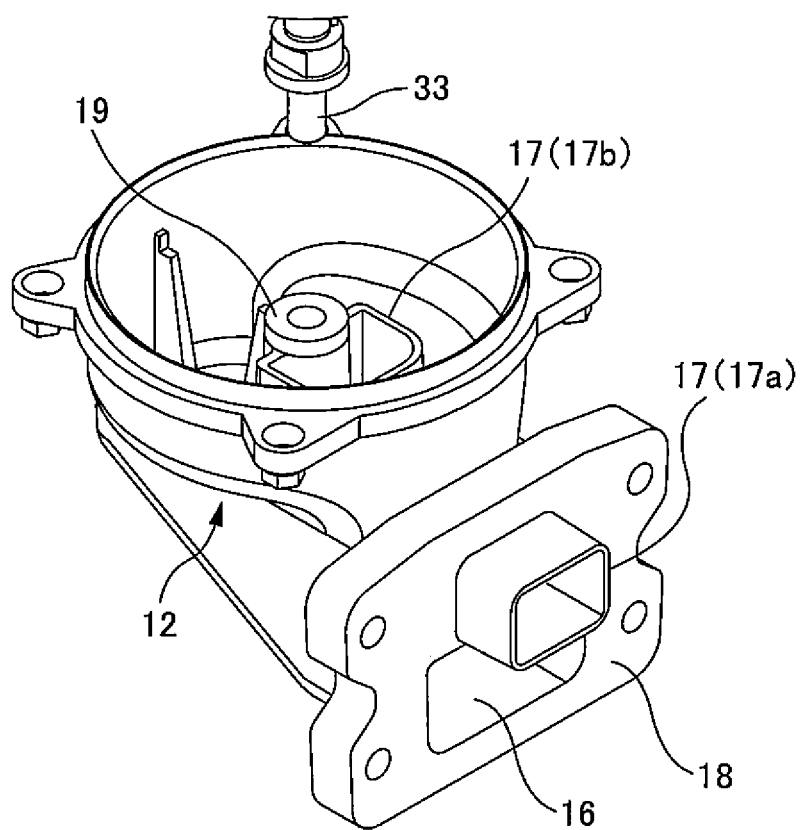
FIG. 5 is a view of a lower case as viewed from obliquely above.

Here, the communication tube portion 16 and the tubular member 17 disposed in the lower case 12 will be described below. As illustrated in FIG. 5, in the internal space of the lower case 12, the cylindrical joint 19 projecting upward is provided. A part of the tubular member 17 is disposed along the joint 19. The tubular member 17 is bent into an L shape in the middle, and the remaining part is disposed parallel to the communication tube portion 16. The tubular member 17 is disposed immediately above the communication tube portion 16, and an end portion of the tubular member 17 projects from the flange 18.

Figure 6:
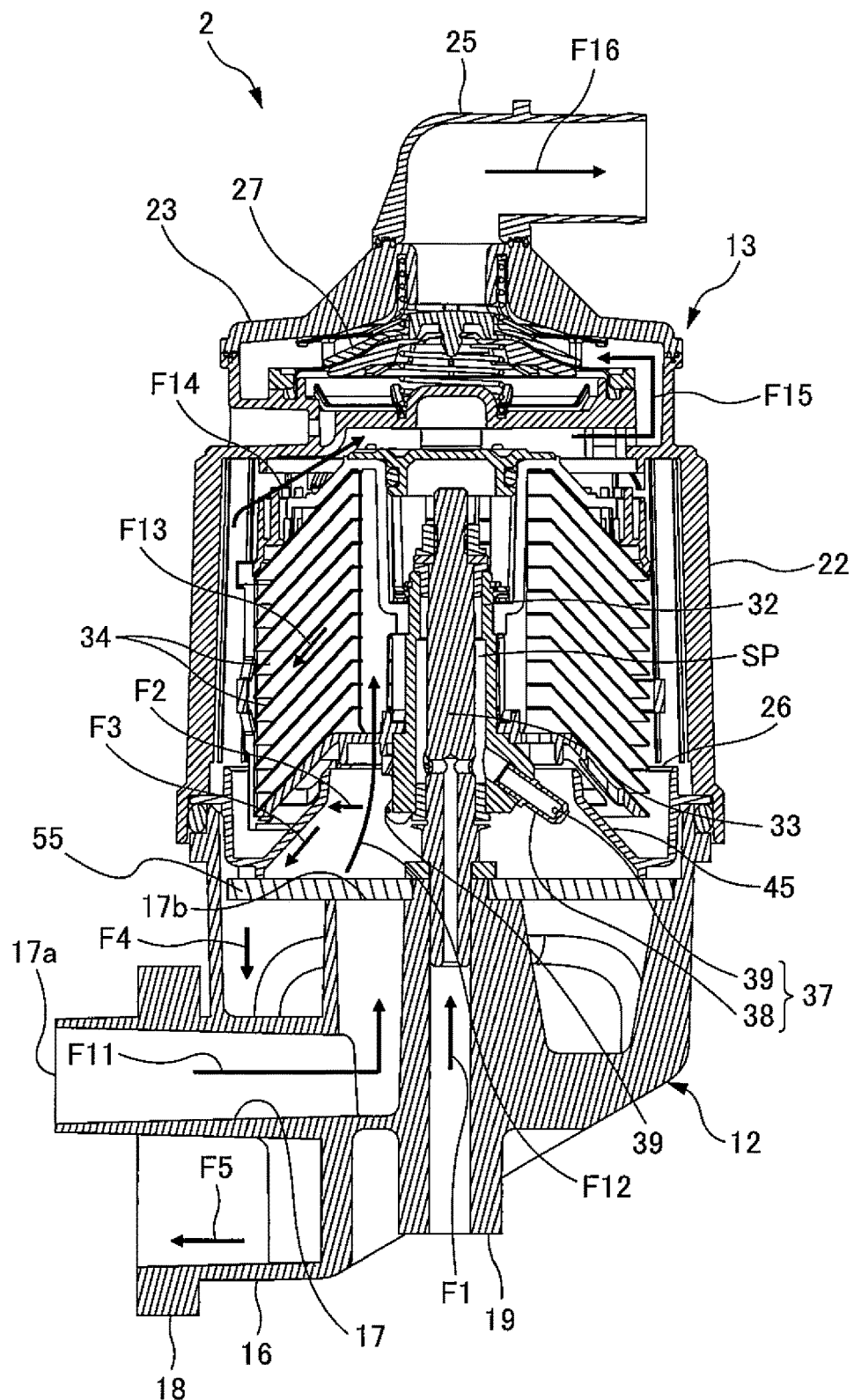
FIG. 6 is a diagram illustrating flows of blow-by gas and oil.

As illustrated in FIG. 6, an upper end portion of the joint 19 is fitted to a stationary frame 55. This stationary frame 55 is a metallic frame mounted to the fitted portion 14 in the lower case 12 (see FIG. 3.) An introduction-inlet 17a of the tubular member 17 for introducing blow-by gas projects beyond the flange 18. An introduction-outlet 17b of the tubular member 17 is disposed near the joint 19 and immediately below the stationary frame 55. The blow-by gas discharged from the tubular member 17 flows upward through the stationary frame 55, and flows into the hollow part of the rotor 31 from an area closer to the rotational center with respect to the turning paths of the injection holes 39.

Next, the separation of the mist oil from the blow-by gas in the oil separator 2 having the foregoing configuration will be described with reference to FIG. 6.

As indicated by an arrow with reference symbol F1, the oil which has been supplied from the engine 4 to the joint 19 through the oil supply pipe 9 flows into the spindle shaft 33. Afterwards, the oil flows from the spindle shaft 33 to the nozzle bodies 38 and is injected from the injection holes 39 as indicated by an arrow with reference symbol F2. By the injection of the oil from each injection hole 39, the rotor 31 and the spindle 32 rotate around the spindle shaft 33.

The injected oil is sprayed to the tapered portion 45 of the partition member 26. And then, as indicated by an arrow with reference symbol F3, the oil is guided obliquely below toward the outer peripheral side along the inclined surface 45a of the tapered portion 45. This can restrain a mixture of oil spray to the blow-by gas. Afterwards, as indicated by an arrow with reference symbol F4, the oil flows down on the inner surface of the lower case 12 to the bottom of the lower chamber 41. And, as indicated by an arrow with reference symbol F5, the oil flows into the communication tube portion 16 and is returned to the crankcase from the side surface of the engine 4.

On the other hand, as indicated by an arrow with reference symbol F11, the blow-by gas from the engine 4 is guided by the tubular member 17. Afterwards, as indicated by an arrow with reference symbol F12, the blow-by gas which has been discharged from the introduction-outlet 17b flows into the hollow part of the rotor 31 through an area inside the motion paths of the injection holes 39. As indicated by an arrow with reference symbol F13, the blow-by gas flowing into the hollow part of the rotor 31 moves through the clearances between the separation disks 34 to the outer peripheral direction of the rotor 31 due to a centrifugal force which is generated by the rotation of the rotor 31. Thus, when the blow-by gas moves to the outer peripheral direction of the rotor 31 due to the centrifugal force, the pressure at the inner peripheral side of the rotor 31 becomes lower than the pressure at the outer peripheral side. Due to the pressure difference, the blow-by gas in the lower chamber 41 becomes more likely to flow into the hollow part at the rotor 31, and thereby the flow efficiency of the blow-by gas increases.

When the blow-by gas comes into contact with the separation disks 34, the mist oil contained in this blow-by gas attaches to the surfaces of the separation disks 34. The attached mist oil and additional mist oil coalesce, and thus the oil condenses on the surfaces of the separation disks 34. That is, the oil undergoes secondary separation. As described above, in the lower chamber 41, the mist oil is separated from the blow-by gas by primary separation. Accordingly, by the secondary separation at the separation disks 34, the mist oil is separated from the blow-by gas at a high level. Thus, the upper chamber 42 corresponds to the secondary separation chamber in which the secondary separation of the remaining mist oil is performed to separate the remaining mist oil from the blow-by gas which has undergone primary separation of the mist oil.

A clearance SP is formed between the spindle 32 and the spindle shaft 33. This clearance SP serves as an oil guiding passage and is filled with the oil which is supplied to be injected from the nozzles 37. Since the oil supply pressure is sufficiently high, some oil filling the clearance SP passes through the upper end of the clearance SP and is discharged from the upper end portion of the spindle 32 to the hollow part of the rotor 31. Similar to the blow-by gas, due to the centrifugal force of the rotor 31, the oil discharged to the hollow part of the rotor 31 moves through the clearances between the separation disks 34 to the outer peripheral direction of the rotor 31.

The oil condensed on the surfaces of the separation disks 34 coalesces with the oil discharged to the hollow part of the rotor 31. This cleans the surfaces of the separation disks 34, and therefore simplifies maintenance for the separation disks 34. The oil which has been condensed on the surfaces of the separation disks 34 and the oil which has coalesced are discharged from the outer peripheral edges of the separation disks 34. The oil collides with the inner surface of the body cover 22, and then flows down along this inner surface. And, the oil joins the oil injected from the nozzles 37 in the lower chamber 41 and is returned to the engine 4.

The blow-by gas, which has passed through the rotor 31 and from which the mist oil has been separated, moves upward while turning. The blow-by gas is introduced to the space on the top surface side of the PCV valve 27, as indicated by arrows with reference symbols F14 and F15. Then, as indicated by an arrow with reference symbol F16, the blow-by gas passes through the outlet pipe 25 and is introduced to the breather pipe 3.

Figure 7A:
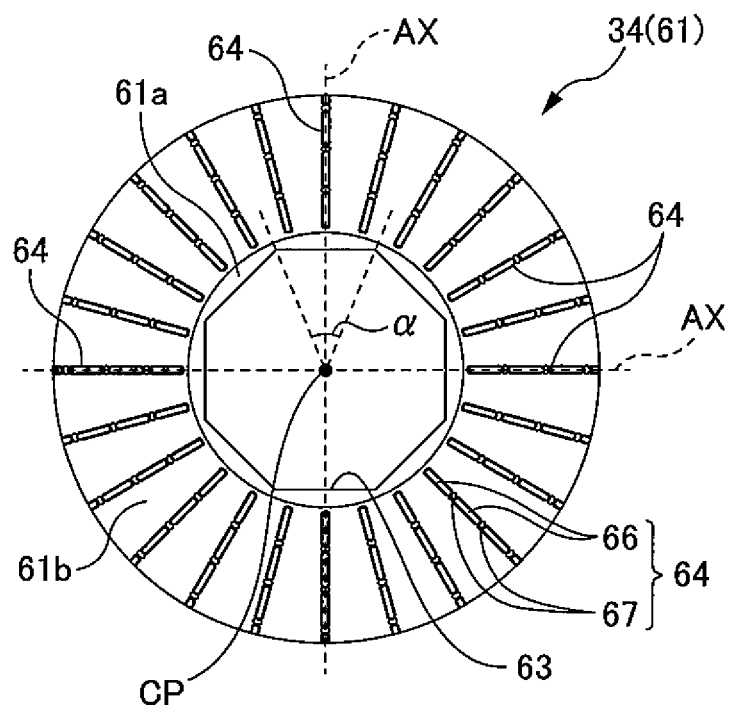
FIG. 7A is a plan view of a first separation disk.
Figure 7B:
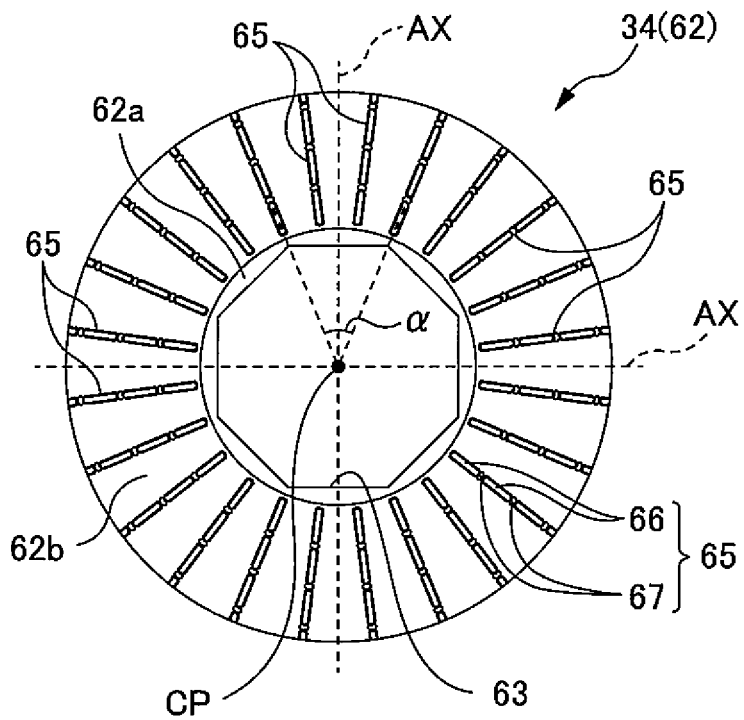
FIG. 7B is a plan view of a second separation disk.

The following describes the separation disk 34 in detail. This first embodiment employs a first separation disk 61, which is illustrated in FIG. 7A, and a second separation disk 62, which is illustrated in FIG. 7B. As illustrated in FIG. 8, these first separation disks 61 and second separation disks 62 are alternately layered. These separation disks 61 and 62 are constituted of truncated cone-shaped plate members. Thus, the separation disks 61 and 62 have a circular shape viewed from a planar direction and have a trapezoidal shape viewed from a side surface direction. In this embodiment, a diameter of the respective separation disks 61 and 62 is 80 to 120 mm and the thickness is 0.3 to 0.4 mm.

On the respective separation disks 61 and 62, at circular center-side parts 61a and 62a, which serve as top surfaces of the truncated cones, mounting openings 63 with regular octagonal shape are formed across the almost entire center-side parts. On surfaces of outer peripheral side parts 61b and 62b, which serve as side surfaces (inclined surfaces) of the truncated cones, 24 pieces of ribs 64 and 65, which extend from a rotational center in a radiation direction, are circumferentially formed at regular intervals. In other words, the respective ribs 64 and 65 are formed at intervals of 15 degrees. In this embodiment, the diameter of the center-side parts 61a and 62a is 40 to 60 mm and a length of a diagonal line passing through the rotational centers of the mounting openings 63 is 36 to 54 mm.

For convenience, in the following descriptions, the ribs formed on the first separation disk 61 are referred to as first concavo-convex ribs 64 and the ribs formed on the second separation disk 62 are referred to as second concavo-convex ribs 65. In this embodiment, the first concavo-convex rib 64 and the second concavo-convex rib 65 have first convex portions 66 and second convex portions 67. The first convex portion 66 has a convex on the front surface side 5 and a concave on the back surface side 69 on its outer peripheral side part. The second convex portion 67 has a convex on the back surface side and a concave on the front surface side on its outer peripheral side part. The first separation disk 61 and the second separation disk 62 have no difference in the mounting openings 63. In view of this, the mounting openings 63 are simply referred to as the mounting openings 63.

As obvious from the comparison between FIG. 7A and FIG. 7B, the difference between the first separation disk 61 and the second separation disk 62 is a formation position of the respective first concavo-convex ribs 64 and a formation position of the respective second concavo-convex ribs 65 with respect to the mounting openings 63. Here, two additional lines AX passing through centers of certain sides on the mounting openings 63 and rotational centers CP, perpendicular to one another are used as the reference. While the four first concavo-convex ribs 64 are positioned on the additional lines AX in the first separation disk 61, the additional lines AX are positioned in the middle of the adjacent second concavo-convex ribs 65 in the second separation disk 62.

Figure 8A:
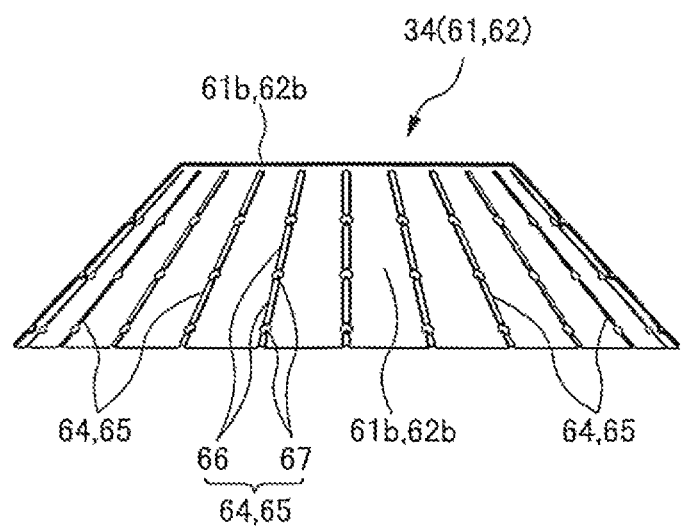
FIG. 8A is a side view of the first separation disk and the second separation disk.
Figure 8B:
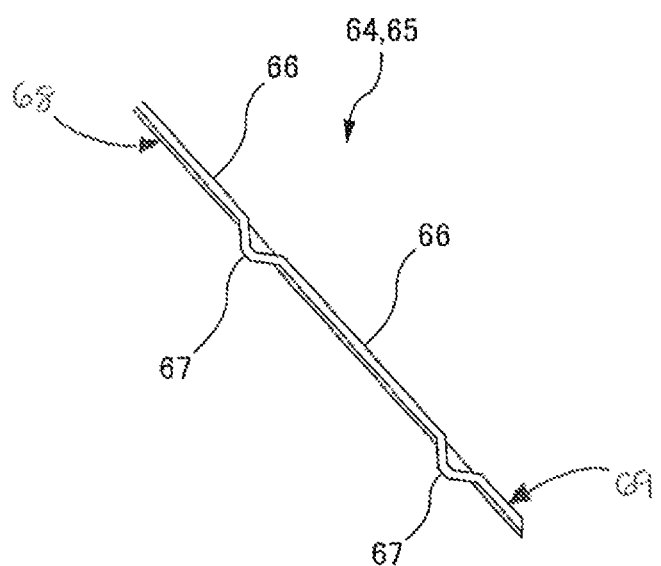
FIG. 8B is a partially enlarged cross-sectional view describing first convex portions and second convex portions.

As illustrated in FIG. 8A and FIG. 8B, the first convex portions 66, which form the first concavo-convex rib 64 and the second concavo-convex rib 65, have a truncated square pyramid shape extending in the radiation direction and the second convex portions 67 have a mortar shape. One piece of the concavo-convex ribs 64 and 65 are formed by forming the four first convex portions 66 and the three second convex portions 67 in alternation along the radial direction. These first convex portions 66 and second convex portions 67 ensure forming the thin first concavo-convex ribs 64 and second concavo-convex ribs 65, reducing weights of the separation disks 34 (61 and 62).

The combination of the first convex portions 66 and the second convex portions 67 forms parts through which the gas is difficult to flow using the second convex portions 67 in the middle of the tunnel-shaped spaces, which are formed with the plurality of first convex portions 66. This lengthens a period that the blow-by gas remains at the respective outer peripheral side parts 61b and 62b, thereby ensuring enhancing separation efficiency of oil mist.

In this embodiment, the circumferential positional relationship between the first concavo-convex ribs 64 and the second concavo-convex ribs 65 is determined by aligning the respective sides of the mounting opening 63 of the first separation disk 61 and the mounting opening 63 of the second separation disk 62. This is because of the following reason. The mounting opening 63 is formed into the regular octagonal shape in plan view. The first concavo-convex ribs 64 are circumferentially disposed at intervals of one-third times (intervals of 15 degrees) of an interior angle α (45 degrees) in the regular octagon. Additionally, the second concavo-convex ribs 65 are circumferentially disposed at intervals of one-third times (intervals of 15 degrees) of the interior angle α at positions circumferentially displaced from the first ribs 64 by one-sixth times (7.5 degrees) of the interior angle α.

Figure 9A:
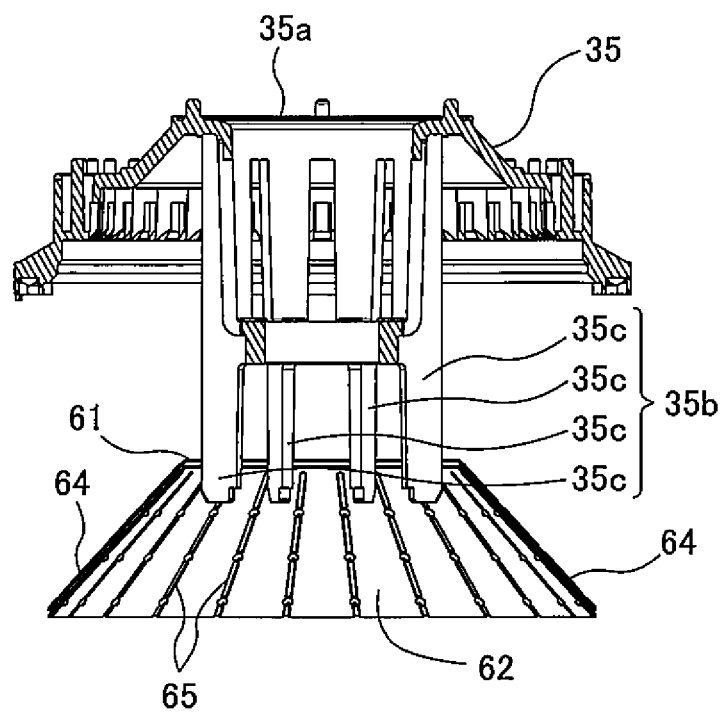
FIG. 9A is a cross-sectional view describing an installation of the separation disks to a disk holding portion.
Figure 9B:
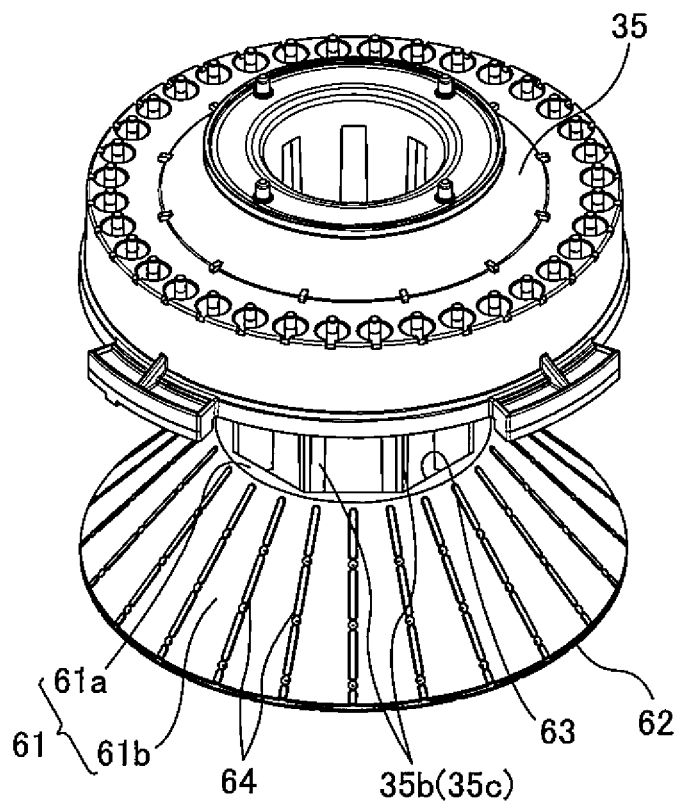
FIG. 9B is a perspective view similarly describing the installation of the separation disks to the disk holding portion.

As illustrated in FIG. 9A, the upper holder 35 includes a disk holding portion 35b at the center-side part. As illustrated in FIG. 9B, the disk holding portion 35b is apart inserted into the mounting openings 63 of the respective separation disks 61 and 62. Since being a part of the upper holder 35, the disk holding portion 35b rotates together with the spindle 32. Engaging the disk holding portion 35b to opening edges (apex parts) on the mounting openings 63 restricts motions of the respective separation disks 61 and 62 in the rotation direction. The disk holding portion 35b of this embodiment is constituted of eight elongate plate-shaped members 35c extending in the axis line direction of the spindle 32.

The plate-shaped members 35c are each disposed from the rotational center to the radiation direction and are circumferentially disposed at intervals of 45 degrees. To install the disks, the respective apexes of the mounting openings 63 are installed so as to come along edges on the respective plate-shaped members 35c, and the respective separation disks 61 and 62 are inserted. By installing the first separation disks 61 and the second separation disks 62 to the disk holding portion 35b in alternation layers, the respective separation disks 61 and 62 in the axis line direction of the spindle 32. The second ribs 65 are disposed between the first ribs 64 circumferentially adjacent to one another.

In this embodiment, the mounting openings 63 of the first separation disk 61 and the second separation disk 62 are formed into the regular octagon, and 24 pieces of the first concavo-convex ribs 64 and the second concavo-convex ribs 65 are each circumferentially formed at intervals of 15 degrees. Additionally, an amount of circumferential displacement of the first concavo-convex ribs 64 and the second concavo-convex ribs 65 with respect to the mounting openings 63 is configured to be 7.5 degrees. Accordingly, only installing the first separation disks 61 and the second separation disks 62 to the disk holding portion 35b in alternation ensures determining the circumferential positions of the respective concavo-convex ribs 64 and 65, also ensuring disposing the second concavo-convex ribs 65 between the first concavo-convex ribs 64 adjacent to one another. Consequently, work efficiency to layer the respective separation disks 61 and 62 on the disk holding portion 35b can be improved.

Figure 10A:
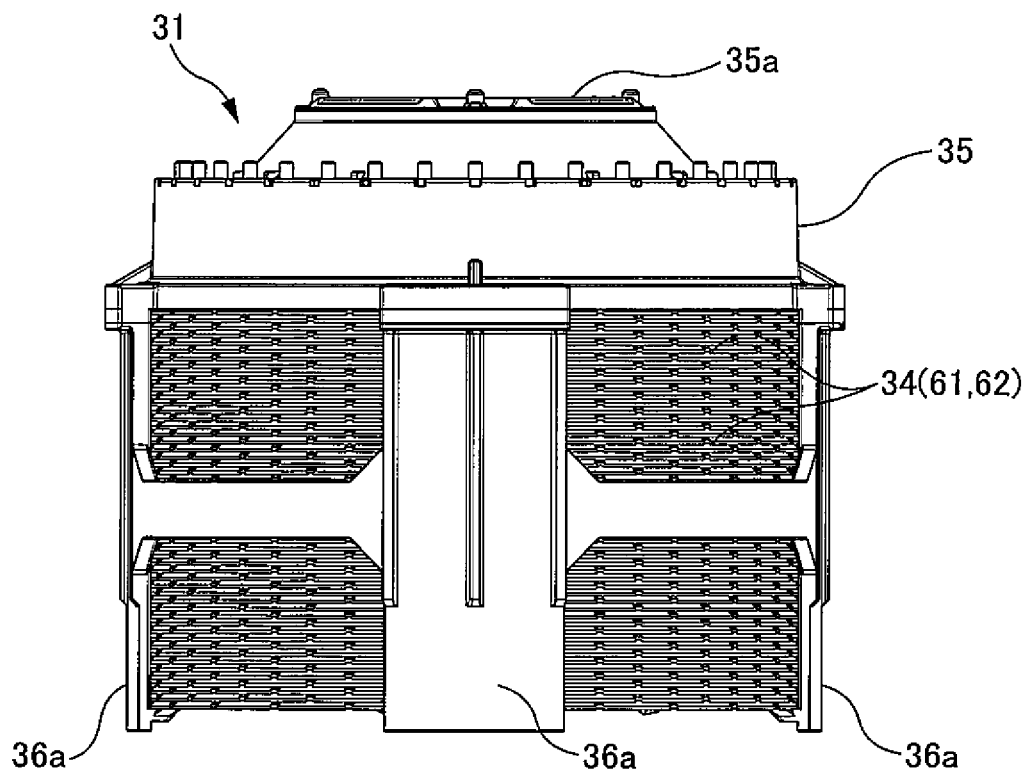
FIG. 10A is a front view of a rotor.
Figure 10B:
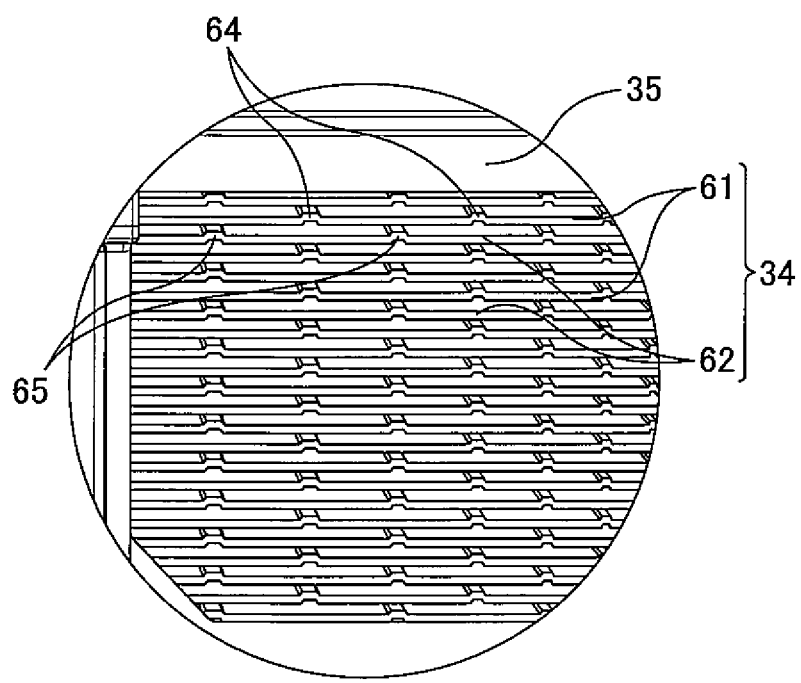
FIG. 10B is a partially enlarged view of the separation disks.
Figure 11A:
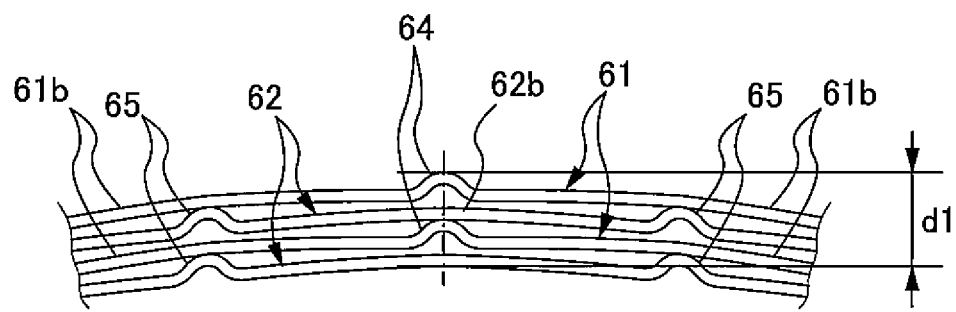
FIG. 11A is a drawing describing a layered state of the separation disks according to an embodiment.

As illustrated in FIG. 10A, the rotor 31 is held in a state where the large number of separation disks 34 (the first separation disks 61 and the second separation disks 62) are layered. As illustrated in FIG. 10B, the first concavo-convex ribs 64 and the second concavo-convex ribs 65 are each arranged in a stagger pattern viewed from the side surface direction. Thus, since the respective concavo-convex ribs 64 and 65 are arranged in the stagger pattern, as illustrated in FIG. 11A, the second concavo-convex ribs 65 are brought into abutment with the thin parts of the first separation disks 61, and the first concavo-convex ribs 64 are brought into abutment with the thin parts of the second separation disks 62. The thin parts of the respective separation disks 61 and 62 slightly curve.

Figure 11B:
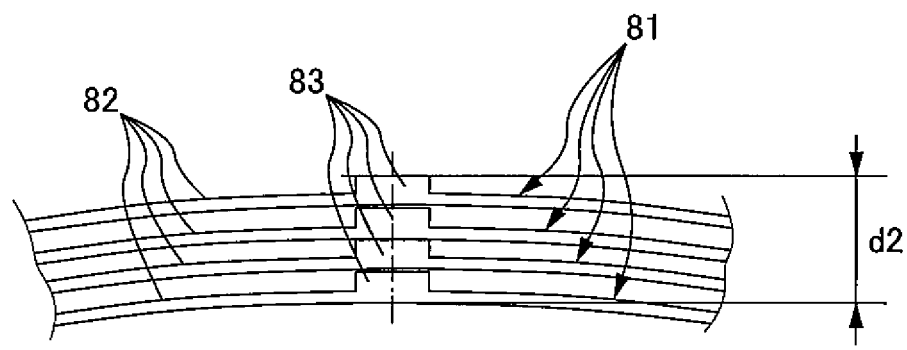
FIG. 11B is a drawing describing a layered state of the separation disks according to a reference example.

FIG. 11B illustrates a state of laminating a plurality of separation disks 81 of a comparative example. The separation disks 81 of the comparative example include ribs 83, which have a rectangular shape in cross section, on outer peripheral side parts 82. That is, the separation disks 81 are also constituted of plate-shaped members with truncated cone shape, and the plurality of ribs 83 are disposed from the rotational center in the radiation direction. In the comparative example, the plurality of separation disks 81 is layered so as to overlap the ribs 83 with one another.

As obvious from the comparison between FIG. 11A and FIG. 11B, this embodiment has circumferentially displaced the positions of the first concavo-convex ribs 64 and the second concavo-convex ribs 65. Therefore, the thin parts of the respective separation disks 61 and 62 slightly curve, and a thickness of the four layered separation disks 61 and 62 becomes d1. In contrast to this, in the comparative example, a thickness of the four layered separation disks 81 is d2, thicker than the embodiment.

The rotor 31 that has layered the separation disks 34 (61 and 62) can enhance the separation efficiency of oil mist as the number of layered separation disks 34 increases. Insofar as the identical height range, the embodiment can layer a greater number of separation disks 34 than that of the comparative example; therefore, the rotor 31 of this embodiment can enhance the separation efficiency of oil mist contained in the target gas.

Figure 12A:
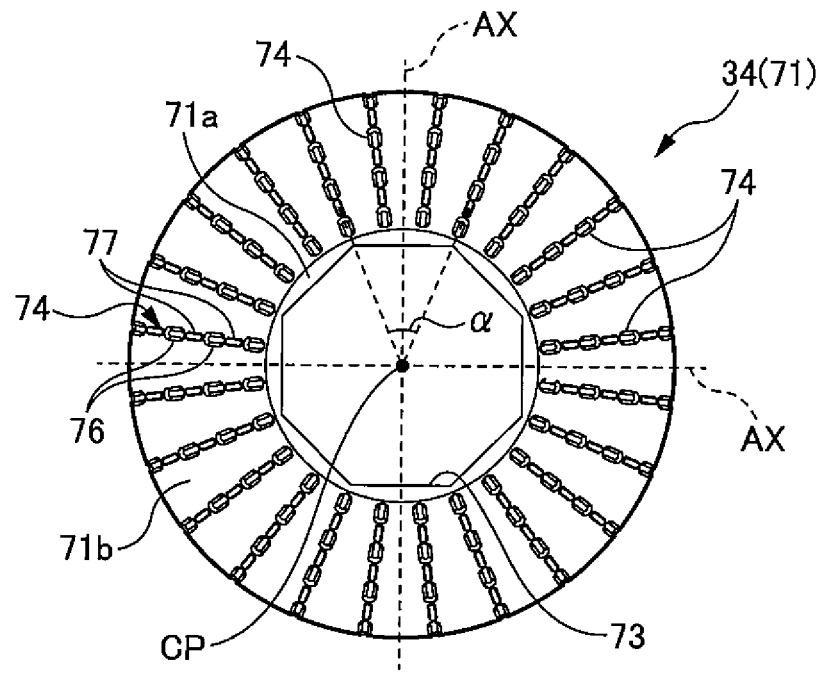
FIG. 12A is a plan view of a first separation disk according to a second embodiment.
Figure 12B:
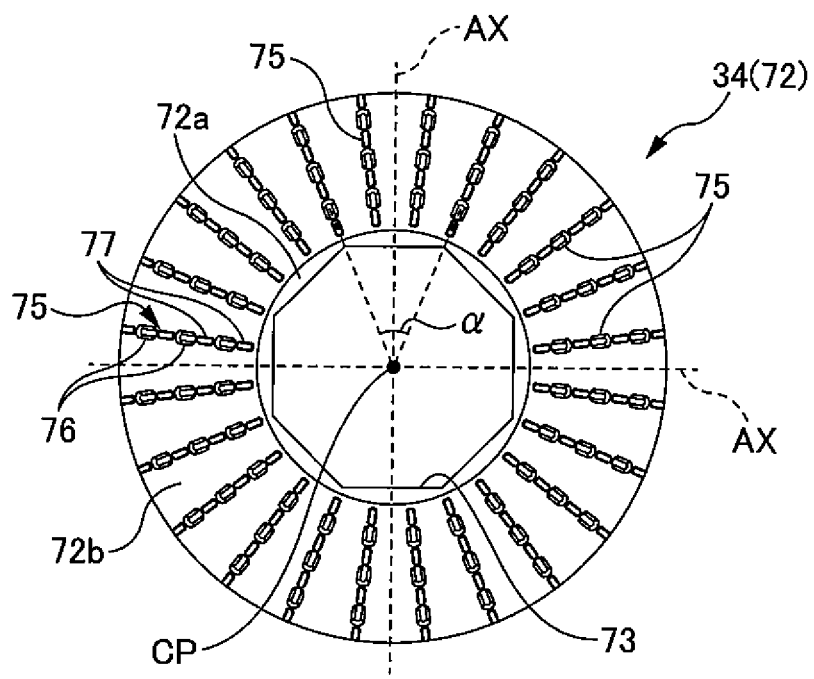
FIG. 12B is a plan view of a second separation disk according to the second embodiment.

The following describes a second embodiment of the present invention. This second embodiment differs from the first embodiment in shapes of respective ribs disposed at first separation disks and second separation disks. FIG. 12A is a plan view of a first separation disk 71 according to the second embodiment. FIG. 12B is a plan view of a second separation disk 72 according to the second embodiment.

As illustrated in these drawings, the first separation disk 71 of the second embodiment includes first concavo-convex ribs 74. The first concavo-convex rib 74 has first convex portions 76 and second convex portions 77 in alternation. The first convex portion 76 has on the outer peripheral side part the front surface side convex and the back surface side concave. The second convex portion 77 has the back surface side convex and the front surface side concave. These first concavo-convex ribs 74 extend from the rotational center CP of the first separation disk 71 in the radiation direction on the outer peripheral side part of the first separation disk 71. The first separation disk 71 circumferentially includes 24 pieces of the first concavo-convex ribs 74 at regular intervals. The second separation disks 72 are also similarly constituted. That is, the second separation disk 72 circumferentially includes 24 pieces of the second concavo-convex ribs 75, which include the second convex portions 77 and the first convex portions 76 in alternation, at regular intervals.

Figure 13A:
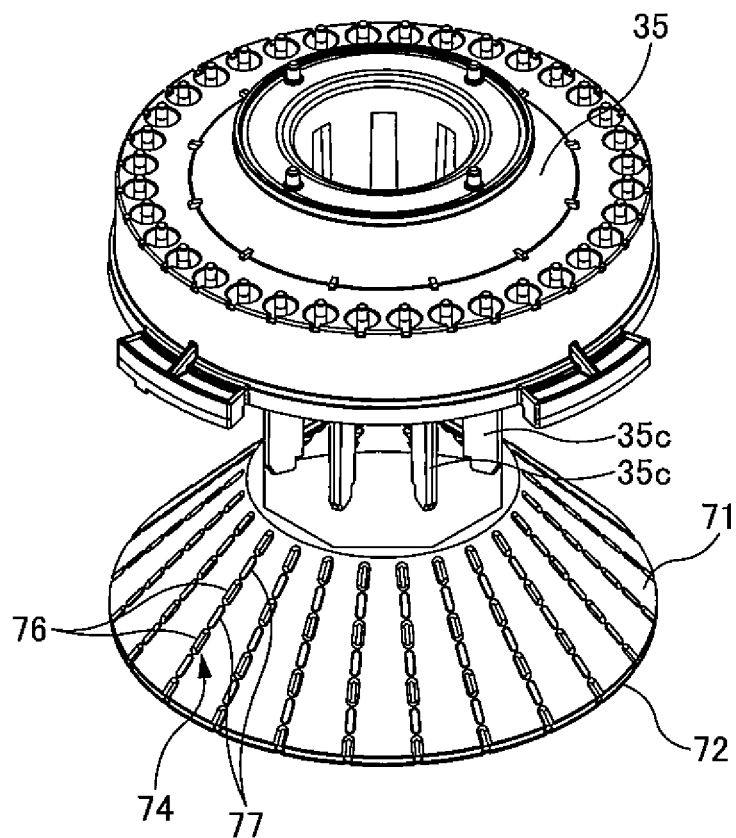
FIG. 13A is an explanatory view of an installation of the respective separation disks to a disk holding portion according to the second embodiment.
Figure 13B:
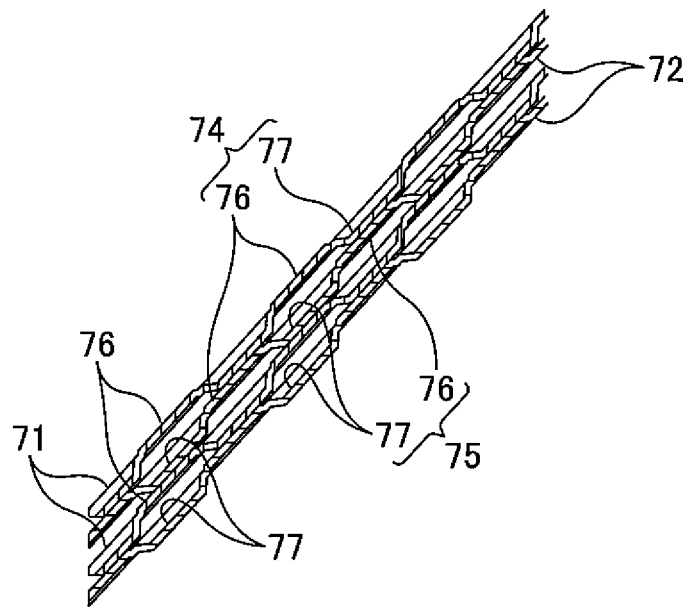
FIG. 13B is a partially enlarged cross-sectional view describing an abutting state of a first concavo-convex rib of the first separation disk and a second concavo-convex rib of the second separation disk.
Figure 14A:
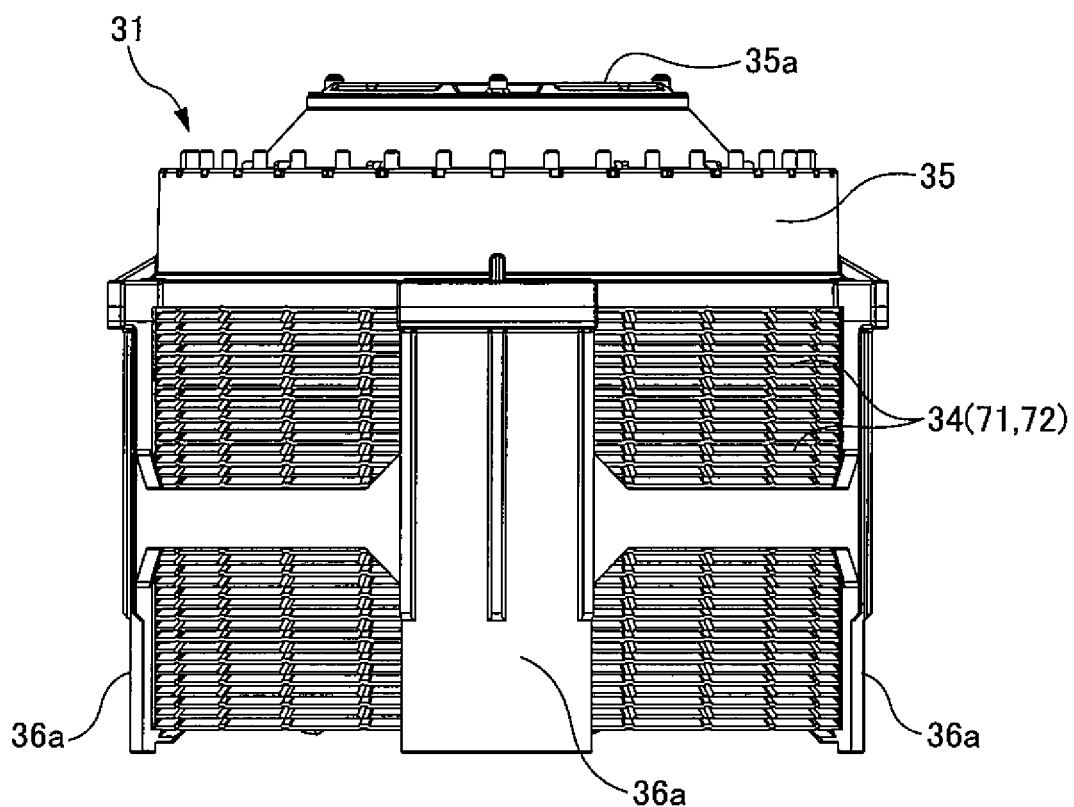
FIG. 14A is a front view of a rotor according to the second embodiment.
Figure 14B:
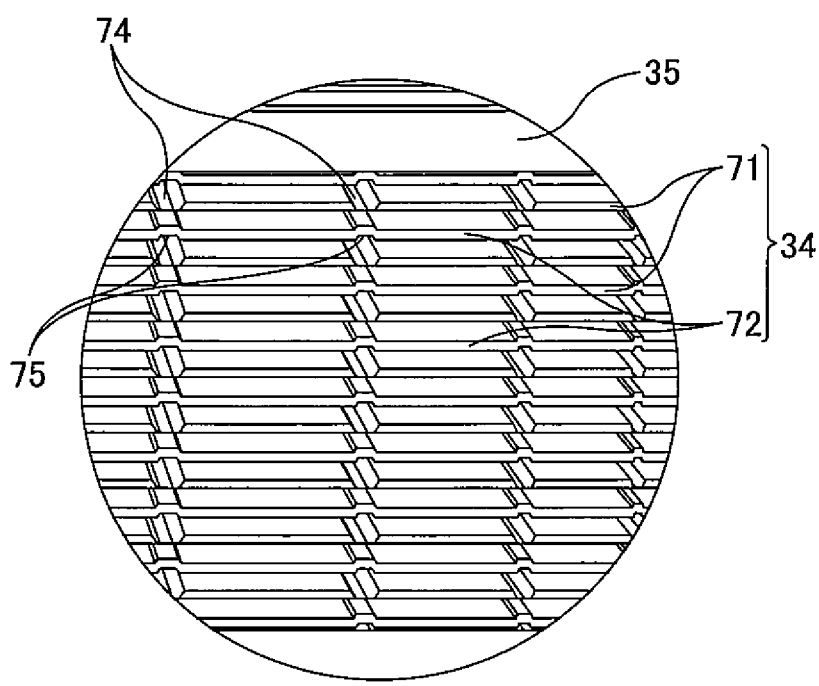
FIG. 14B is a partially enlarged view of the separation disks according to the second embodiment.

In the second embodiment as well, at center-side parts of the respective separation disks 71 and 72, mounting openings 73 with regular octagonal shape are formed. As obvious from the comparison between FIG. 12A and FIG. 12B, a circumferential formation position of the respective first concavo-convex ribs 74 and a circumferential formation position of the respective second concavo-convex ribs 75 with respect to the mounting openings 73 are identical. Accordingly, as illustrated in FIG. 13A, installing the respective apexes of the mounting openings 73 so as to come along edges on the respective plate-shaped members 35c and installing the first separation disks 71 and the second separation disks 72 to the disk holding portion 35b in alternation brings the first concavo-convex ribs 74 into abutment with the second concavo-convex ribs 75. That is, as illustrated in FIG. 13B, the second convex portions 77 on the first concavo-convex rib 74 are brought into abutment with the first convex portions 76 on the second concavo-convex rib 75. Similarly, the first convex portions 76 on the first concavo-convex rib 74 are brought into abutment with the second convex portions 77 on the second concavo-convex rib 75.

The respective separation disks 71 and 72 of the second embodiment also include the thinned first convex portions 76 and second convex portions 77 provided to the first concavo-convex rib 74 and the second concavo-convex rib 75. This allows a weight reduction of the respective separation disks 71 and 72. In the second embodiment, the abutment of the first concavo-convex ribs 74 with the second concavo-convex ribs 75 forms a plurality of holes that circumferentially pass through.

As described above, the oil moves on the surfaces of the respective separation disks 71 and 72. The oil then moves in a complicated route because of the plurality of additionally formed holes. For example, the restriction of the circumferential motion with the first concavo-convex ribs 74 and the second concavo-convex ribs 75 incorporate the oils into one another. Afterwards, the oil passes through the additionally formed holes and then another first concavo-convex rib 74 and second concavo-convex rib 75 restrict the circumferential motion. This operation causes the oils to be easily incorporated into one another, ensuring to enhance the separation efficiency of oil mist.

The description of the above-described embodiment is for ease of understanding of the present invention and does not limit the present invention. The present invention may be modified or improved without departing from the gist and includes the equivalents. For example, the present invention may be configured as follows.

In the above-described respective embodiments, the mounting openings 63 and 73 of the separation disks 34 (61, 62, 71, and 72) were in a regular octagon; however, the mounting openings 63 and 73 may be in another regular polygon.

For example, assume the case where the mounting opening of the separation disk 34 has a regular hexagonal shape. In this case, it is only necessary that the first concavo-convex ribs are circumferentially disposed at intervals of one-third times (intervals of 20 degrees) of the interior angle α (60 degrees) in the regular hexagon and the second concavo-convex ribs are circumferentially disposed at intervals of one-third times (intervals of 20 degrees) of the interior angle α at positions circumferentially displaced from the first concavo-convex ribs by one-sixth times (10 degrees) of the interior angle α. Alternatively, assume the case where the mounting opening has a regular decagon shape. It is only necessary that the first concavo-convex ribs are circumferentially disposed at intervals of one-third times (intervals of 12 degrees) of the interior angle α (36 degrees) in the regular decagon and the second concavo-convex ribs are circumferentially disposed at intervals of one-third times (intervals of 12 degrees) of the interior angle α at positions circumferentially displaced from the first concavo-convex ribs by one-sixth times (6 degrees) of the interior angle α.

In short, defining the number of ribs arranged between a certain apex of the mounting opening to the adjacent apex as n, it is only necessary that the first concavo-convex ribs are circumferentially disposed at intervals of 1/n times of the interior angle in the regular polygon. And it is only necessary that the second concavo-convex ribs are circumferentially disposed at intervals of 1/n times of the interior angle α at positions circumferentially displaced from the first concavo-convex ribs by 1/2n times of the interior angle α.

The above-described embodiments use a plurality of the elongate plate-shaped members 35c for the disk holding portion 35b as the example; however, the constitution is not limited to this. For example, the disk holding portion may be constituted of a tubular member with regular polygonal shape in cross section on which a large number of ventholes are bored on the wall portion.

The above-described first embodiment has layered the two types of separation disks, the first separation disks 61 and the second separation disks 62, in alternation. However, the present invention is not limited to the constitution of laminating the two types of separation disks in alternation. That is, the present invention may have layered the separation disks of equal to or more than three types in order.

Defining the type of the separation disk as N, it is only necessary that an amount of circumferential displacement of the ribs provided to the respective separation disks is determined as 1/N times of 1/n times of the interior angle α. Assume the case of three types (N=3) of first to third separation disks, it is only necessary that an amount of displacement of the second separation disks is determined as ⅓n times of the interior angle α with respect to the first separation disks. Similarly, it is only necessary that an amount of displacement of the third separation disks is determined as ⅓n times of the interior angle α with respect to the second separation disks.

REFERENCE SIGNS LIST 1 closed crankcase ventilation system, 2 oil separator
3 breather pipe, 4 engine, 5 intake-side flow passage
6 air filter, 7 turbocharger, 8 charge cooler
9 oil supply pipe, 11 housing, 12 lower case, 13 upper case
14 fitted portion in lower case
15 lower end portion in upper case
16 communication tube portion, 17 tubular member
18 flange, 19 joint, 21 rotor unit, 22 body cover
23 disk-shaped top surface cover, 24 gas discharge portion
25 outlet pipe, 26 partition member
27 PCV valve, 31 rotor, 32 spindle, 33 spindle shaft
33a oil supply passage, 34 separation disk
35 upper holder, 35a cap member, 35b disk holding portion
35c plate-shaped member, 36 lower holder, 36a coupling arm
37 nozzle, 38 nozzle body, 39 injection hole
41 lower chamber, 42 upper chamber
43 communication port
44 outer peripheral portion
45 tapered portion
45a inclined surface
46 collar portion
47 diaphragm, 48 upper spring
49 lower spring
51 pedestal portion, 52 air communicating portion
53 communicating window, 54 cylindrical rib
55 stationary frame, 61 first separation disk
61a circular center-side part of first separation disk
61b outer peripheral side part of first separation disk
62 second separation disk
62a circular center-side part of second separation disk
62b outer peripheral side part of second separation disk
63 mounting opening, 64 first concavo-convex rib
65 second concavo-convex rib
66 first convex portion, 67 second convex portion
71 first separation disk, 72 second separation disk 73 mounting opening, 74 first concavo-convex rib
75 second concavo-convex rib, 76 first convex portion,
77 second convex portion,
81 separation disk of comparative example,
82 outer peripheral side part of separation disk of comparative example,
83 rib of separation disk of comparative example,
SP clearance between spindle and spindle shaft,
AX additional line of separation disk,
α interior angle of mounting opening

The invention claimed is:

1. An oil separator comprising:
a rotor rotatable together with a spindle, the rotor being configured to separate mist oil from target gas through a rotation, wherein
the rotor includes an upper holder, a lower holder, and separation disk,
the separation disk is configured of a truncated-cone shaped plate member, the separation disk having formed a rib on an outer peripheral side part corresponding to an inclined surface of the truncated-cone shaped plate member, the rib extending from a rotational center in a radiation direction, and the separation disk being layered in an axis line direction of the spindle, and
the rib includes
a first convex portion having on the outer peripheral side part a convex on a front surface side and a concave on a back surface side and
a second convex portion having on the outer peripheral side part a convex on a back surface side and a concave on a front surface side, wherein said first convex portion and said second convex portion are alternately disposed along said rib in the radial direction; further comprising a disk holding portion connected to the spindle, the disk holding portion being disposed in the axis line direction of the spindle, wherein the separation disk includes a first separation disk that includes a mounting opening at a center-side part, the mounting opening forming an opening edge that can be engaged to the disk holding portion, the first separation disk having circumferentially formed a plurality of first concavo-convex ribs at regular intervals on a surface of the outer peripheral side part, the first concavo-convex ribs extending from a rotational center in a radiation direction and a second separation disk that includes the mounting opening at a center-side part, the second separation disk having circumferentially formed a plurality of second concavo-convex ribs, the second concavo-convex ribs extending on a surface of the outer peripheral side part from a rotational center in a radiation direction, the second concavo-convex ribs being disposed between the first concavo-convex ribs circumferentially adjacent to one another with the disk holding portion inserted into the mounting opening—has been inserted; wherein the mounting openings are disposed at the first separation disk and the second separation disk are formed into a regular polygonal shape in plan view, the first concavo-convex ribs are circumferentially disposed at intervals of 1/n times of an interior angle in the regular polygon, and the second concavo-convex ribs are circumferentially disposed at intervals of 1/n times of the interior angle at positions circumferentially displaced from the first concavo-convex ribs by 1/2n times of the interior angle; further comprising a disk holding portion connected to the spindle, the disk holding portion being disposed in the axis line direction of the spindle, wherein the separation disk includes a first separation disk that includes a mounting opening at a center-side part, the mounting opening forming an opening edge that can be engaged to the disk holding portion, the first separation disk having circumferentially formed a plurality of first concavo-convex ribs at regular intervals, the first convex portions and the second convex portions being formed in alternation on the first concavo-convex ribs and a second separation disk that includes the mounting opening at a center-side part, the second separation disk having circumferentially formed a plurality of second concavo-convex ribs, the second convex portions and the first convex portions being formed in alternation on the second concavo-convex ribs, the second concavo-convex ribs being formed at intervals identical to intervals of the first concavo-convex ribs, and the first separation disks and the second separation disks are layered in alternation with respect to the disk holding portion such that the first convex portions of the first concavo-convex ribs are brought into abutment with the second convex portions of the second concavo-convex ribs and the second convex portions of the first concavo-convex ribs are brought into abutment with the first convex portions of the second concavo-convex ribs.

2. The oil separator according to claim 1, further comprising
a nozzle that projects from a peripheral surface of the spindle on a lower side with respect to the separation disk, the nozzle being configured to inject oil from an injection hole to rotate the spindle about an axis line,
a housing that partitions a chamber housing the spindle, the rotor, and the nozzle, and
a gas introducing portion configured to introduce the target gas that is supplied from outside the housing to the mounting opening at a position on the spindle side with respect to a trace of the nozzle.

3. The oil separator according to claim 1, further comprising
a nozzle that projects from a peripheral surface of the spindle on a lower side with respect to the separation disk, the nozzle being configured to inject oil from an injection hole to rotate the spindle about an axis line,
a housing that partitions a chamber housing the spindle, the rotor, and the nozzle, and
a gas introducing portion configured to introduce the target gas that is supplied from outside the housing to the mounting opening at a position on the spindle side with respect to a trace of the nozzle.

4. The oil separator according to claim 1, further comprising
a nozzle that projects from a peripheral surface of the spindle on a lower side with respect to the separation disk, the nozzle being configured to inject oil from an injection hole to rotate the spindle about an axis line,
a housing that partitions a chamber housing the spindle, the rotor, and the nozzle, and
a gas introducing portion configured to introduce the target gas that is supplied from outside the housing to the mounting opening at a position on the spindle side with respect to a trace of the nozzle.

5. The oil separator according to claim 1, further comprising a nozzle that projects from a peripheral surface of the spindle on a lower side with respect to the separation disk, the nozzle being configured to inject oil from an injection hole to rotate the spindle about an axis line,
a housing that partitions a chamber housing the spindle, the rotor, and the nozzle, and
a gas introducing portion configured to introduce the target gas that is supplied from outside the housing to the mounting opening at a position on the spindle side with respect to a trace of the nozzle.

* * * * *